Patented Dec. 14, 1926.

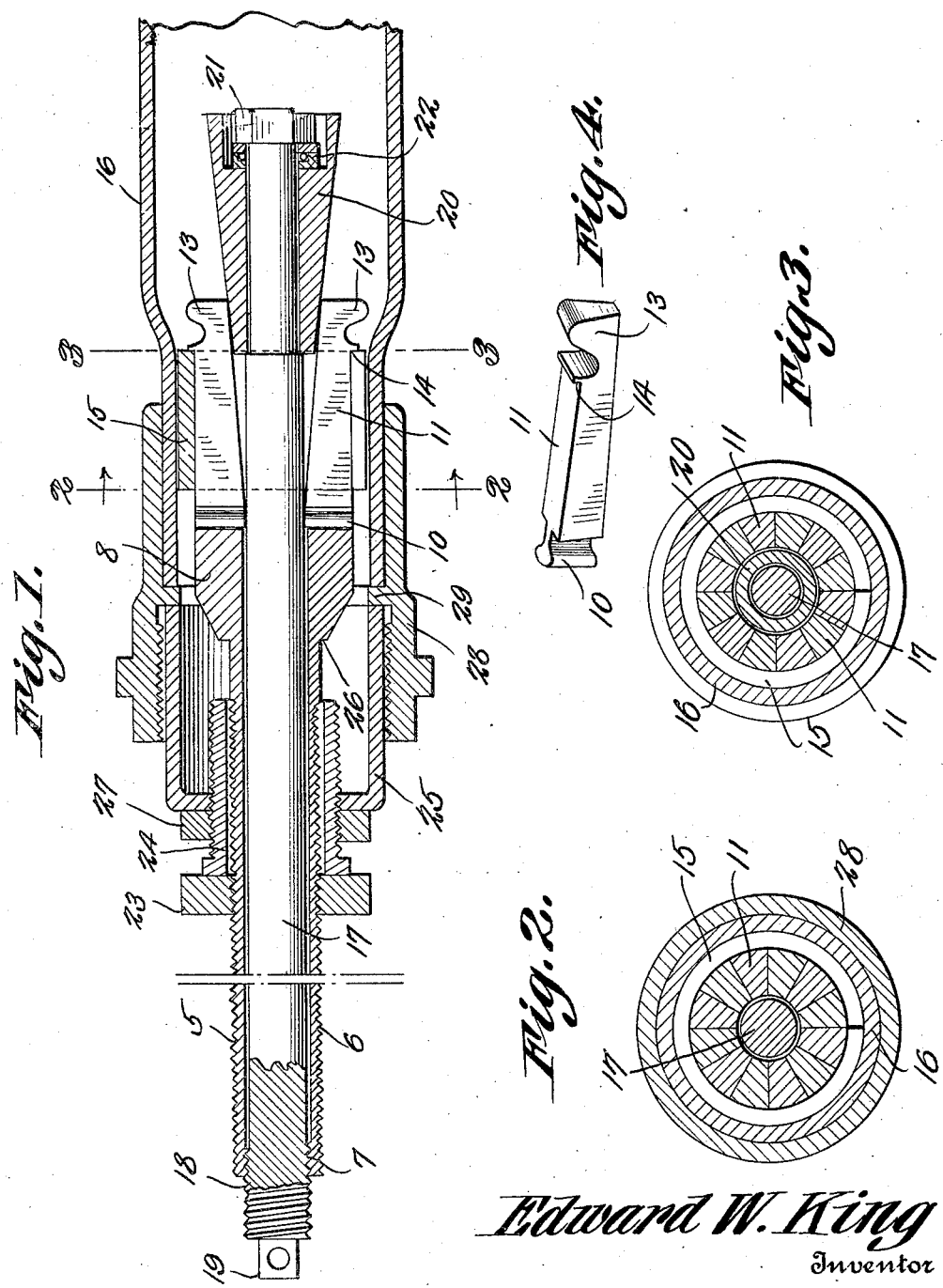

1,610,796

UNITED STATES PATENT OFFICE.

EDWARD W. KING, OF WARREN, OHIO.

TOOL.

Application filed November 4, 1925. Serial No. 66,787.

This invention has reference to a tool especially designed for use in positioning hose in coupling and securing bands employed as a means for securing a hose within its coupling.

An important object of the invention is to provide a device of this character which will place hose in coupling and evenly expand the securing band into close engagement with the hose to force the hose into engagement with the coupling attached thereto, the band acting to set up a clamping action with one portion of the coupling.

Another object of the invention is to provide a locking sleeve for locking the positioning member of the tool in its proper position to insure the true positioning of the securing band.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a longitudinal sectional view through a tool constructed in accordance with the invention, showing the same as positioning an expansible band within a coupling.

Figure 2 is a sectional view taken on line 2—2 of Figure 1.

Figure 3 is a sectional view taken on line 3—3 of Figure 1.

Figure 4 is a perspective view of one of the expanding segments.

Referring to the drawing in detail, the device includes a tubular body portion indicated by the reference character 5, which is formed with external threads 6 arranged throughout the length thereof and internal threads 7 disposed adjacent to its outer end.

As shown, the body portion 5 is formed with an enlargement 8 defining a shoulder 26 for purposes to be hereinafter more fully described. This enlargement 8 is provided with a plurality of openings disposed adjacent to one end thereof, in which openings the head 10 of the expanding segments 11 are positioned, the sizes of the openings being such as to permit of movement of the heads within their openings to accomplish the expanding result for which the segments are designed.

These expanding segments 11 are formed with heads 13 which are provided with shoulders 14 adapted to engage one end of the expanding band 15 which is employed as a securing element for securing the hose within its coupling, the hose being indicated by the reference character 16.

Positioned within the tubular body portion 5 is a rod 17 that is formed with threads 18 adjacent to its outer end, and provided with a reduced portion 19 for the reception of a wrench whereby the rod may be rotated and moved longitudinally of the body portion 5 for purposes to be hereinafter more fully described.

Mounted on the opposite end of the rod 17 is an expanding head 20 which is formed with a tapered surface coacting with the expanding segments for moving them laterally. This expanding head 20 is loosely held on the rod 17 and secured against displacement by means of the nut 21 and anti-friction member 22, the anti-friction member acting to permit easy and free movement of the nut and rod 17 with respect to the expanding head.

Positioned on the threads 6 of the body portion 5 is a nut 23 adapted to engage one end of the adjusting collar 24 to restrict movement of the adjusting collar longitudinally of the body portion 5. Threads are formed exteriorly of the adjusting collar 24 and engage threads formed in the central opening of the sleeve 25 to the end that the collar 24 may be adjusted longitudinally of the sleeve 25 so that the inner end of the collar 24 may be located in a position to restrict movement of the body portion 5 by contact of the shoulder 26 formed on the enlargement 8 with the inner end of the collar 24. Thus it will be seen that due to this construction, the tool may be employed for positioning securing bands in unions of various sizes.

After the collar 24 has been properly positioned, for securing a predetermined sized band, a lock nut 27 is provided and adapted to engage one end of the sleeve 25 to set up a binding action between the threads of the collar 24 and sleeve 25.

In the use of the tool the sleeve 25 is positioned within the union or hose coupling, which in the present showing is indicated by the reference character 28, until the inner end of the sleeve 25 engages the flange 29 of the coupling wherein the collar 24 is moved to its proper position for the setting or positioning of the expanding band for the particular coupling.

The lock nut 27 is now positioned to prevent movement of the collar 24. The expanding band having been positioned on the expanding segments as shown by Figure 1, the body portion 5 is drawn laterally by the rotation of the nut 23, which bears against one end of collar 24. The nut 23 is rotated until the shoulder 26 is brought into engagement with the inner end of collar 24. With the band 15 in its proper securing position, the rod 17 is rotated to cause the member 20 to be drawn within the expanding segments, which causes the expanding segments to move laterally and force the securing band into close engagement with the hose to secure the same within its coupling by setting up a clamping action between the band and coupling.

After the band has been properly positioned, the tool may be removed by reversing the rotation of the nut 23 and rod 17.

I claim:—

An expanding tool including an elongated body portion having external threads and having a head formed at its inner ends, said head having a plurality of openings, expanding segments having heads at their inner ends, the heads of the expanding segments adapted to be fitted in the openings of the first mentioned heads to removably secure the expanding segments thereto, a rod extended through the body portion, an expanding member at one end of the rod and adapted to engage the segments for moving them outwardly, means for adjusting the rod with respect to the body portion, and means for adjusting the body portion and rod with respect to the article with which the device is used.

In testimony that I claim the foregoing as my own, I have hereto affixed my signature.

EDWARD W. KING.